United States Patent

Binnig et al.

[11] Patent Number: 6,079,255
[45] Date of Patent: Jun. 27, 2000

[54] MECHANICALLY COUPLED ALTERNATIVELY USABLE CANTILEVER STRUCTURES FOR SCANNING A SURFACE

[75] Inventors: Gerd K. Binnig, Wollerau; Jürgen Brugger, Zurich; Walter Haeberle, Waedenswil; Heinrich Rohrer, Richterswil; Peter Vettiger, Langnau, all of Switzerland

[73] Assignee: International Business Machines Corporation, Armonk, N.Y.

[21] Appl. No.: 09/142,796
[22] PCT Filed: Mar. 13, 1996
[86] PCT No.: PCT/IB96/00209
§ 371 Date: Sep. 14, 1998
§ 102(e) Date: Sep. 14, 1998
[87] PCT Pub. No.: WO97/34122
PCT Pub. Date: Sep. 18, 1997

[51] Int. Cl.⁷ .............................. G01B 5/28; G01B 7/34
[52] U.S. Cl. ................................................. 73/105
[58] Field of Search .................... 73/78, 81, 82, 73/105

[56] References Cited

U.S. PATENT DOCUMENTS 5,276,672  1/1994  Miyazaki et al. ................ 73/105 X
5,461,907  10/1995  Tench et al. ...................... 73/105
5,475,318  12/1995  Marcus et al. .................... 324/762
5,540,958  7/1996  Bothra et al. .................... 427/535

FOREIGN PATENT DOCUMENTS 472342   2/1992  European Pat. Off. .......... 73/105
919073   10/1954  Germany ........................ 73/105
60-161508  8/1985  Japan ............................. 73/105
29894   12/1994  WIPO ............................. 73/105

OTHER PUBLICATIONS

IBM Technical Disclosure Bulletin, "Double Cantilever Sensor for Thin–Hardness Testing and Mass Storage Application", vol. 34, No. 10a, Mar. 1992, pp. 194–195.

Mamin, "Thermal Writing Using a Heated Atomic Microscope Tip", Appl. Phys. Lett., vol. 69, No. 03, Jul. 15, 1996, pp. 433–435.

Primary Examiner—Daniel S. Larkin
Attorney, Agent, or Firm—Ronald L. Drumheller

[57] ABSTRACT

The present invention concerns a cantilever arrangement for scanning a surface. This arrangement comprises a first cantilever having a first probe and a second cantilever having a second probe. Both cantilevers are mechanically coupled such that the second cantilever follows the movement of the first cantilever, i.e. the deflection of the first cantilever defines the deflection of the second cantilever.

22 Claims, 8 Drawing Sheets

(bottom view)

(cross-section)

(bottom view)

(cross-section)

(bottom view)

(cross-section)

(cross-section)

(bottom view)

(bottom view)

(bottom view)

(bottom view)

MECHANICALLY COUPLED ALTERNATIVELY USABLE CANTILEVER STRUCTURES FOR SCANNING A SURFACE

TECHNICAL FIELD

The present invention relates to a special cantilever design which is well suited for applications such as scanning probe microscopes (AFM, STM) or scanning probe storage systems, scanning lithography systems, combined atomic force/tunneling microscopes (AFM/STMs))and so forth. The present invention also enables special modifications and improvements of the above systems.

BACKGROUND OF THE INVENTION

The development of scanning tunneling and atomic force microscopes has led to various kinds of applications. Examples of these applications are: scanning probe storage systems, e.g. storage systems making use of parallel local probes, scanning probe lithography systems, test equipment comprising a scanning probe or array of probes, atomic resolution, high throughput inspection systems, and scanning probe system used for the structuring of surfaces;such a semiconductor chips and the like.

Scanning probe microscopes and scanning probe storage systems making use of the tunneling current require a mechanism to ensure that the scanning probe (or arrays of scanning probes) is kept in close proximity to the sample or storage medium. This can for example be achieved by means of a special cantilever carrying a probe, as disclosed in the U.S. Pat. No. 5,036,490. Such a cantilever may be equipped with a piezoactuator, for example, to allow adjustment of the distance between storage medium and probe. To obtain a memory of sufficient storage capacity a scanning probe system (AFM- and STM-based systems) would require hundreds of cantilevers each of which being equipped with its own actuators and driving circuitry. The manufacturing of such cantilevers with piezo actuators is complicated, expensive, and the reproducibility and applicability as mass-storage devices is currently questionable.

Most atomic force scanning probe systems are operated in contact mode, i.e. the probe(s) is brought into direct contact with the sample or storage medium. To obtain information of the sample or storage medium, the probe is scanned in contact over its surface. The operation in contact mode greatly affects the reliability of the probe, which usually comprises a sharp tip-like element, due to wear-out. The wear-out in turn leads to reduced reproducibility and increased cost because the tip or probe has to be replaced from time to time. Furthermore, the surface to be scanned may be damaged.

There are other scanning probe systems where the probe, sample, or both together are oscillated. This usually leads to a situation where the tip of the probe frequently contacts the sample or storage medium. This mode of operation was, for example, addressed for the first time in the article "Atomic Force Microscope", G. Binnig and C. F. Quate, Physical Review Letters, Vol. 56, No. 9, pp. 930–933. In the following, this mode of operation is referred to as tapping mode.

As outlined above, most scanning probe systems (AFM- and STM-based) require means for adjustment/control of the distance between the scanning probe and surface to be scanned. Usually, actuators are employed requiring driving circuitry and wiring. Dense packaging is thus difficult.

Not only in case of high-end scanning probe systems, but also in case of low-end systems, there is a demand for simplification of adjustment and control of the distance between the probe on one hand and the sample or storage medium on the other hand.

Some of the above systems are also designed for use in an ultra high vacuum (UHV). The dimensions of a UHV chamber area limited and scanning probe systems of very small size are required.

It is a disadvantage of most currently available scanning probe systems that they are complex and expensive. Furthermore, the handling of such systems is usually difficult. Conventional scanning probe systems have to be operated carefully in order to avoid damage of the local probe.

It is an object of the present invention to provide simpler and more robust scanning probe systems.

It is an object of the present invention to provide a new, improved cantilever design for use in connection with, or as part of any kind of scanning probe systems, including low-end scanning probe systems.

It is a further object of the present invention to provide new or improved scanning probe systems enabled by the inventive cantilever design.

SUMMARY OF THE INVENTION

This has been achieved by the provision of a new and inventive cantilever arrangement. This cantilever arrangement is characterized in that there are at least two cantilevers being mechanically coupled. Each of these two cantilevers comprises a probe which may differ in size, shape, material, robsutness, and so forth. The two cantilevers are designed and coupled such that the deflection of the second cantilever depends on the deflection of the first cantilever.

Depending on the application, one of the cantilevers, e.g. a cantilever having a smaller probe, may be operated in AFM mode or STM mode. Either one of the two cantilevers or both cantilevers may comprise means for actuation, such as a piezo actuator for example. Instead of using means for fine actuation, the inventive cantilever arrangement may be designed such that attractive forces (adhesion) or external forces (electrostatic/magnetic) pull one of the cantilevers into contact mode. However, a fine actuator may be employed in addition to adjust ('fine tune') the distance between probe and surface to be scanned. In case of one cantilever being operated in STM mode, a fine actuator is required to ensure that the tunneling distance between its probe and the surface is kept constant using a feedback mechanism.

DESCRIPTION OF THE DRAWINGS

The invention is described in detail below with reference to the following schematic drawings (it is to be noted that these drawings are not drawn to scale).

GENERAL DESCRIPTION

Figure 1A:
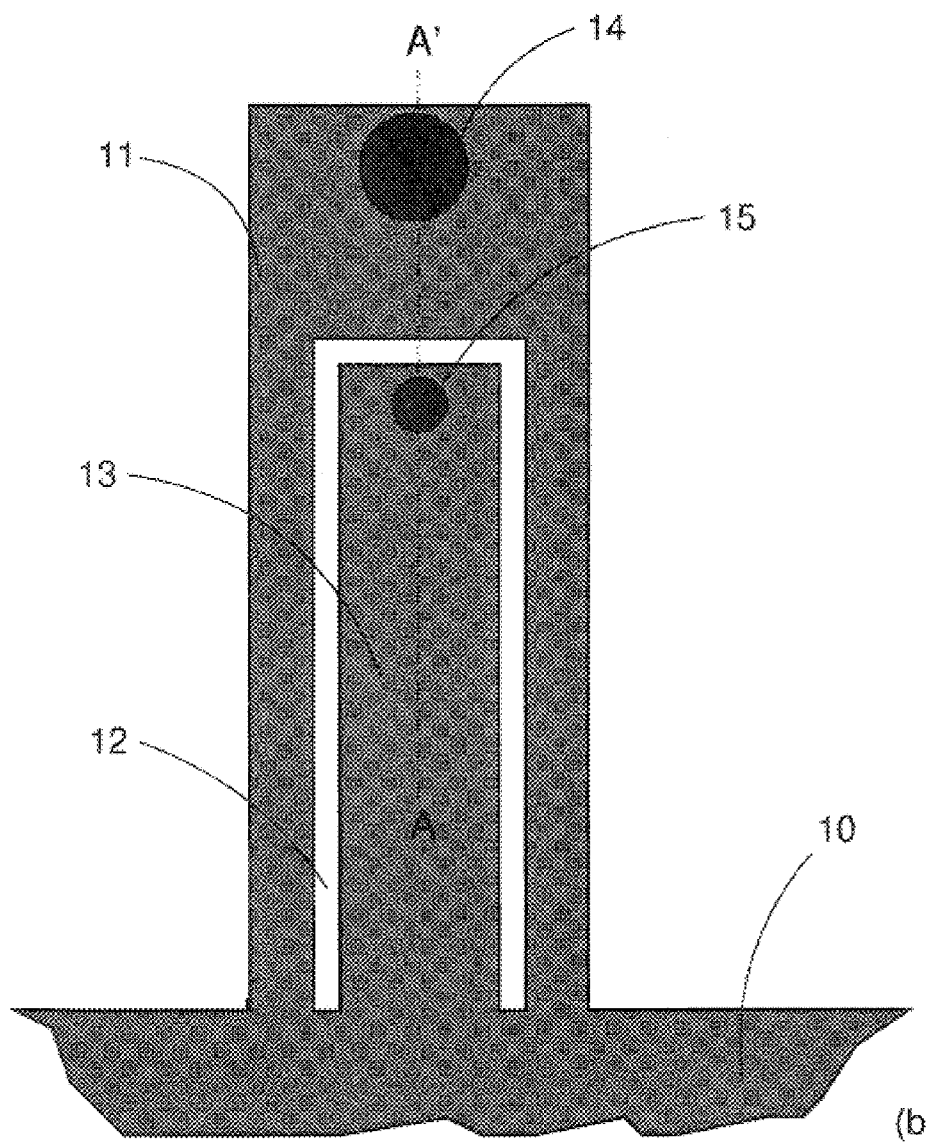
FIG. 1A shows a schematic bottom view of a first embodiment of the present invention.

Before different embodiments of the present invention are described, the basic elements of scanning probe systems, in accordance with the present invention, are addressed. It is to be noted that the word 'sample' which is usually used in connection with scanning probe microscope systems shall also cover storage media, electronic circuits, and semiconductor chips to be made or tested, surfaces to be structured or modified and so forth.

Cantilevers:

Cantilevers are well known elements which are easy to make. Existing semiconductor fabrication processes can be employed. In essence, the techniques of micromachining are employed to create discrete cantilevers and arrays of cantilevers. When dimensioning such cantilevers, one has to take into account specific parameters of the material used as substrate in which the cantilevers are formed. When properly designing a cantilever or a cantilever array, it can be mass-produced by batch processing at low cost and with high yield.

Usually, cantilevers are made by etching away portions of a silicon substrate. This substrate is normally (100) or (111) oriented. (100) oriented silicon could for example be wet etched using ethyl diamine pyrocatechol or KOH solutions. Wet etching techniques are generally dependent on crystallographic orientation of the substrate, e.g. (100) oriented silicon shows a very low etch rate of the (111) plane, leading to a good etch stop along the (111) axis which generates well defined etch planes with $54.7^\circ$ angles from (100). An alternative approach makes use of dry etching techniques, e.g. reactive-ion beam etching (RIE), chemically assisted ion beam etching, microwave assisted plasma etching, or inductively coupled plasma etching. Depending on process conditions, deep and anisotropic or isotropic structures can be obtained leading to excellent dimensional control. Masks can be employed to define the structures to be etched.

Likewise, cantilevers may be manufactured or modified using the focussed ion beam milling technique. In this technique, a pre-fabricated cantilever is enclosed in a vacuum chamber at a base pressure of about $2.3 \times 10^{-6}$ mbar, for example. From an ion source, gallium (Ga) ions are accelerated by a high voltage (10–30 kV) and focussed on the target. A current of 12–12000 pA is used to erode the material at the target spot. The efficiency of the process can be enhanced by directing a stream of e.g. chloride molecules to a target area. Grooves, trenches, holes, and other constrictions can be comfortably produced by applying this method. The equipment for focussed ion beam milling is commercially available.

Focussed ion beam milling can also be used to modify conventional cantilevers. It is for example possible to form a smaller cantilever, or an array of cantilevers in a conventional cantilever.

The cantilevers used can have any shape that can be made using the above mentioned techniques. The cross-sectional shape perpendicular to the longitudinal axis of the cantilever could be rectangular, round, elliptical, or polygonal, for example.

Also suited for the fabrication of cantilevers are other semiconducting materials, like gallium arsenide, as reported in "dynainic Micromechanics on Silicon: Techniques and Devices", K. E. Petersen, IEEE Transactions on Electronic Devices, Vol. ED25, No. 10, 1978, pp. 1241–1249.

Local probes:

The word 'probe' herein used is meant to cover any kind of structure suited to interact directly or indirectly with the surface to be investigated, storage medium to be interacted with, or surface to be structured or modified. It also includes AFM and STM kind of probes. Usually a tip or a ball-like element is used as probe. Different techniques are known to produce such probes. They can, for example, be made by isotropic wet or dry etching in combination with the oxidation of a single crystal material, such as silicon.

The following materials are well suited for making local probes and local probe arrays: tungsten, tungsten alloy, platinum, molybdenum, silicon (doped or undoped), doped diamond, any refractory metal, or conductive ceramics, to name some. The combination of wet or dry etching and liftoff plus oxidation leads to very sharp pointed cones. The sharper the tips are, the denser information on a storage medium can be stored, leading to increased capacity of a storage device. Or, in case of a scanning probe used to investigate a sample, the radius of the tip is directly related to the resolution of the scanning system. The probes can be coated with an appropriate metal such as gold, for example. In U.S. Pat. No. 5,204,581, it is described in detail how to make tips or arrays of tips; which can be used in connection with the present invention. Another example for the microfabrication of a tip is disclosed in the article "Silicon cantilevers and tips for scanning force microscopy", J. Brugger et al., Sensors and Actuators A, Vol. 34, 1992, pp. 193–200. It is important to note that by means of batch fabrication local probes can be made in a reproducible and cheap manner. In particular large probes can be made by means of electro-plating. To achieve this, a plating base is required to define the position where the probe is to be formed.

According to the present invention, there are always at least two probes. These probes may differ in size, shape, robustness, or material E.g., one of the probes may be substantially smaller than the other one, or one probe may be softer than the other probe. As will be seen in connection with the embodiments, it is advantageous to employ one probe of larger size in order to reduce damages of the surface to be scanned and ruining of the smaller probe which is usually more sensitive to forces, or to generate lower resolution images in a large scan mode. In addition, the larger probe may be made using a soft material.

Scan movement:

Different approaches for achieving a scan movement of the probes with respect to the storage medium, sample, or surface can be employed. The respective means are referred to as actuators. One can use a variety of scanning schemes including pulsed and continuous scanning. Furthermore, the scanning speed may be varied and means to allows zoom-in can be supported.

The different cantilever movements which can be achieved with an integrated piezoelectric actuator are described in the published PCT patent application WO 89/07256.

Actuators:

As indicated above, each cantilever, or cantilever array may comprise an actuator so as to displace it from a relaxed position to a deflected position or vice versa. Scan movement is obtained by actuators designed for lateral cantilever displacement. The distance between probe and surface to be investigated may be controlled using actuators for vertical displacement. The displacement achieved by an actuator might be damped to prevent damage and to allow better and more precise operation. Special means for damping may be employed which allow to provide a damping factor depending on the displacement. It is also possible to use damping means which can be switched or controlled to allow adaptation of the damping behavior. This can be done by controlling the viscosity of a liquid material by altering its temperature.

Piezoceramic (piezoelectric) actuators are well known in the art and have been employed in different kinds of scanning probe systems. Such piezoceramic actuators allow for displacements in the $\mu$m range. A piezoelectric actuator for micromechanical devices is for example described in Sensors and Actuators, A21–A23 (1990), pp.226–228 by F. R. Blom et al. A voltage applied to the actuator gives rise to a deflection of the cantilever to which said actuator is attached or of which it is an integral part.

Numerous proposals are known to exploit the piezoelectric material of the cantilever in order to control its deflection when approaching the surface to the sample. Examples for these proposals are found in the European patent application EP-A-0 492 915, showing different ways of producing cantilever probes with several piezoelectric layers and an appropriate number of electrodes to apply a voltage to the piezoelectric layers. U.S. Pat. No. 4,906,840 discloses a similar layered cantilever structure with a piezoelectric bimorphous layer allowing the cantilever beam to be bent in opposite directions from its rest position. In some embodiments, the control circuitry necessary to load the piezoelectric bimorph is proposed to be integrated into the substrate from which the cantilever is etched.

Another kind of actuator is disclosed in copending FPCT patent application with publication No. WO96/07074. The actuator disclosed therein is based on the well-known principle of magnetic induction/magnetomotive force. The effect of magnetic induction is characterized by the force that a magnetic field or the change of a magnetic field exerts upon a magnet, a current carrying conductor or an otherwise magnetized material within this field. The forces induced are controlled by means of reducing gear and damping means. The magnetic induction actuator is particularly well suited for realizing simple but reliable positioning of a probe with respect to a sample or vice versa.

Another example is a capacitive actuator which is activated by applying a voltage between two electrodes (electrostatic deflection)

Instead of using an actuator driven by a current or voltage, an actuator may be employed which can be activated by inducing heat, e.g. by means of a light beam. The heat introduced may lead to an expansion of certain layers or portions forming the actuator. The expansion in turn may cause a deflection of a cantilever. The heat may likewise be generated by a voltage drop at a resistor formed in or at the cantilever.

Instead of using an actuator, the inventive cantilever arrangement may be designed such that attractive forces (adhesion) pull one of the cantilevers into contact mode.

Most of the actuators need appropriate wiring and driving circuitry. In a system where a probe is to be operated in contact mode, means have to be provided which allow to 'switch' the probe into contact mode. This can either be done using an actuator for vertical displacement, or by means of appropriately designed cantilevers which are soft enough to be attracted by the sample to be investigated. In the latter case the dual cantilever structure, according to the present invention, is very simple because no actuator for bringing the probe into contact mode is required. However, if a suited actuator is employed it is possible to actively switch the probe into contact mode position and vice versa.

An STM-based scanning probe system demands for good control of the distance between second cantilever and sample to be investigated. This distance may be actively adjusted/controlled by means of an actuator for vertical displacement.

Coarse Actuators:

For most applications the present cantilever arrangement renders coarse actuators unnecessary. The position of one of the cantilevers depends on the size, shape, and position of the other cantilever to which it is mechanically coupled i.e., the second cantilever follows the movement of the first cantilever, for instance. Nevertheless, a coarse macroscopic vertical displacement adjustment might be advantageous under certain circumstances. Coarse displacement can be used to compensate manufacturing tolerances and to move the present cantilever arrangement into a park position when not being used, for example. For coarse displacement PZT (a piezoelectric ceramic material; Lead Zirconate Titanate) actuators or precision levers and micrometer screws can be used.

The above mentioned actuators need specific driving circuitry which can either be integrated onto the cantilever substrate, or which can be carried out separately.

As described above, any kind of actuator can be used in connection with the invention. For sake of simplicity details of these actuators are not shown in the Figures, or, where necessary, only illustrated schematically.

Driving circuitry:

Certain means, including driving circuitry, preamplifiers, and an appropriate wiring for reading and writing information may be provided. To make these means one can employ existing tools and processes common to the semiconductor and solid-state industries. Depending on the specific application, miniaturization is mandatory to obtain short interconnections, high speeds, and reduced power consumption. Part or all of the driving circuitry may even be integrated into the cantilever chip.

Deflection sensors:

In order to detect the deflection of an AFM scanning probe, a deflection sensor is to be employed. The deflection of a cantilever is usually detected using optical or piezoresistive deflection sensors.

A piezoresistive resistor, for example, may be embedded at the fixed end of the cantilever arm. Deflection of the free end of the cantilever arm produces stress along the cantilever. That stress changes the resistor's resistance at the base of the cantilever in proportion to the canlilever's deflection. A resistance measuring apparatus is coupled to the piezoresistive resistor to measure its resistance and to generate a signal corresponding to the cantilever arm's deflection. As demonstrated for the first time in the copending patent publication No. WO97/09584 filed on Sep. 1, 1995 such piezoresistive detectors can be formed in a constriction at the fixed end of the cantilever such that it undergoes even stronger stress.

An optical deflection sensor comprises a light source, e.g. a laser diode, and a photodetector. The light emitted by the light source is directed onto the cantilever and the photodiode is arranged such that reflected light is collected by it. A deflection of the cantilever leads to changed deflection of the light beams. This change in deflection can be detected by said photodiode and analyzed to obtain information as to amount of displacement of the cantilever.

Both detection approaches can be applied to the present invention. It is even conceivable to detect the movement of one of the cantilevers by means of a piezoresistive detector whereas an optical deflection sensor is used to detect any movement of the second cantilever.

Figure 1B:
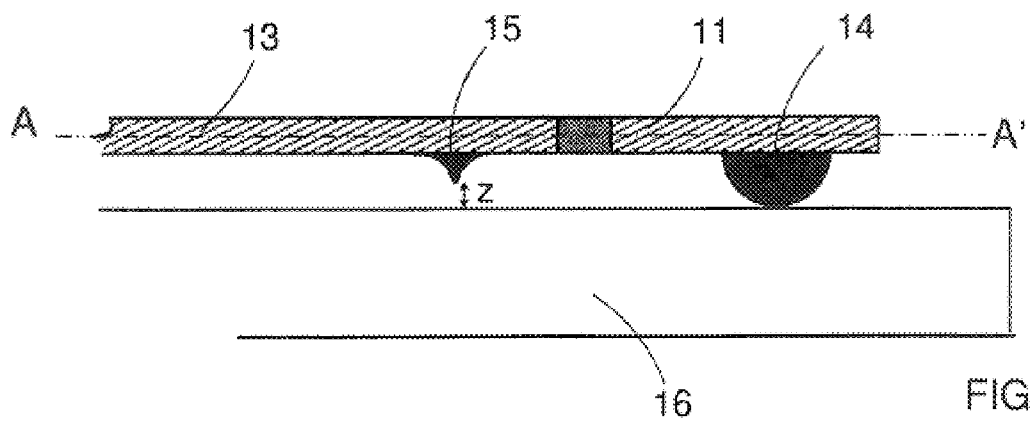
FIG. 1B shows a schematic cross-section of the first embodiment.

The present invention is now described in connection with a first embodiment. This embodiment is shown in FIGS. 1A and 1B. In FIG. 1A, a bottom view of an inventive dual cantilever arrangement is shown. There is a first cantilever 11 having a large probe 14 close to its free end. This first cantilever 11 carries a second, smaller cantilever 13 which in turn has a small probe 15. Such a smaller cantilever may be formed by etching away certain portions of the larger cantilever 11. In the present example, the second cantilever 13 is an integral part of the first cantilever and both cantilevers are mechanically coupled such that the second cantilever's deflection is defined by the deflection of the first cantilever 11. As illustrated in FIG. 1A, a gap 12 may be formed such that the second cantilever 13 is only clamped at one end. The large cantilever is formed in a substrate 10.

For better illustration, a cross-sectional view (from point A to A') of the two cantilevers 11 and 13 is shown in FIG. 1B. As can be seen in this Figure, the geometry of the cantilever 11 and the probe 14 as such define the distance z between the smaller probe 15 and the surface 16 to be scanned. The smaller probe 15 now floats above the surface 16 and is protected from being mechanically damaged because it follows the movement (deflection) of the cantilever 11. Using a suitable actuator, the smaller probe 15 may now either be brought into contact mode, e.g. enabling AFM operation, or the distance z may be varied carefully to allow STM-mode operation. The cantilever 11 may also comprise an actuator or actuators as well as deflection sensors. Neither the actuator(s) nor the deflection sensors are shown in FIGS. 1A and 1B. The inventive dual cantilever arrangement of FIGS. 1A and 1B is suited for any kind of scanning probe systems as will be described later in connection with examples. Such an inventive cantilever arrangement does not only reduce wear-out, it also allows a mode of operation where the larger probe 14 is used for large scan excursion, e.g. in the millimeter range. As soon as a particular scan position is reached, the smaller probe 15 may than be used for zoom-in, i.e. for scanning a smaller portion of the surface 16 with higher resolution. In another mode, both probes can be operated simultaneously. The output signal of the two probes have to be processed in an appropriate manner to obtain information from the surface scanned.

Figure 2A:
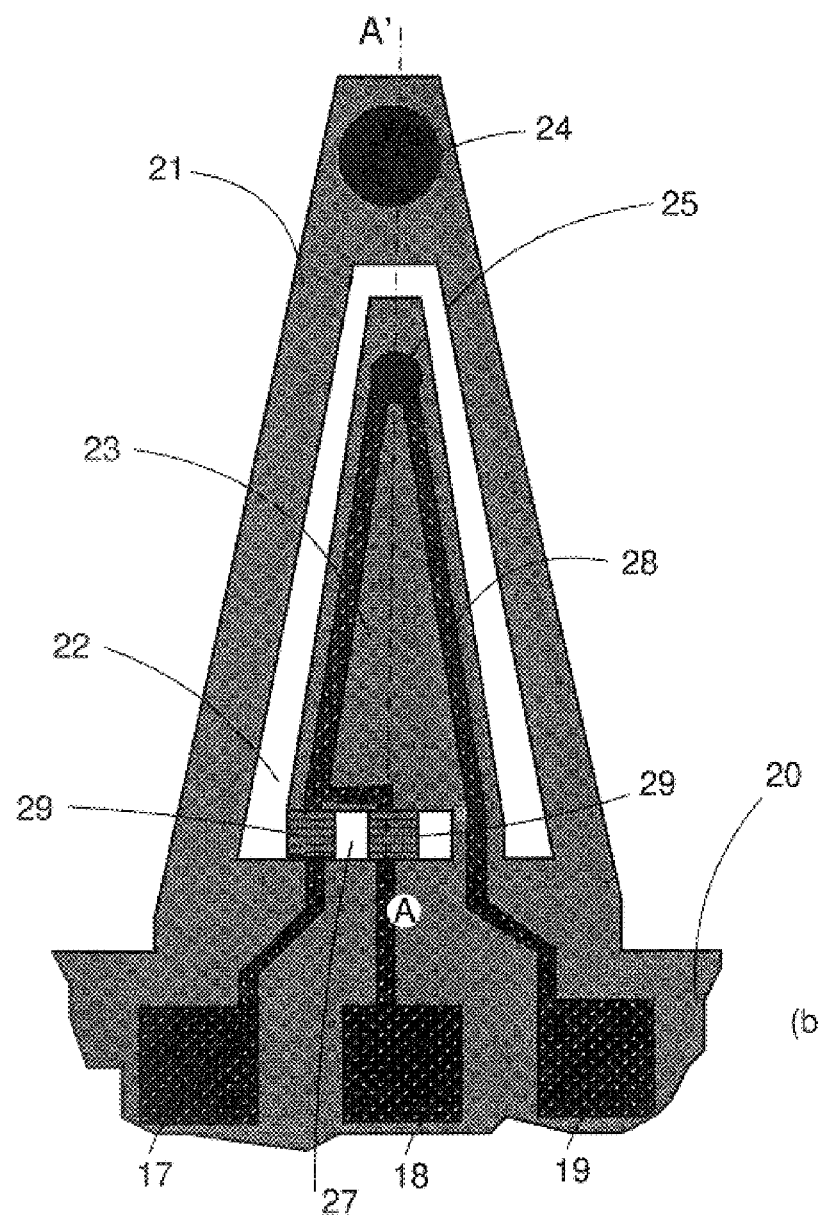
FIG. 2A shows a schematic bottom view of a second embodiment of the present invention.
Figure 2B:
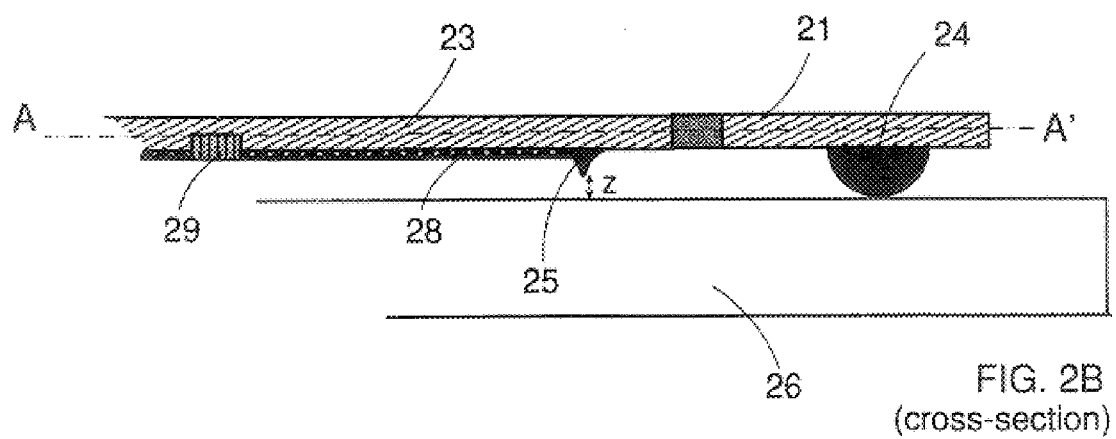
FIG. 2B shows a schematic cross-section of the second embodiment.
Figure 3A:
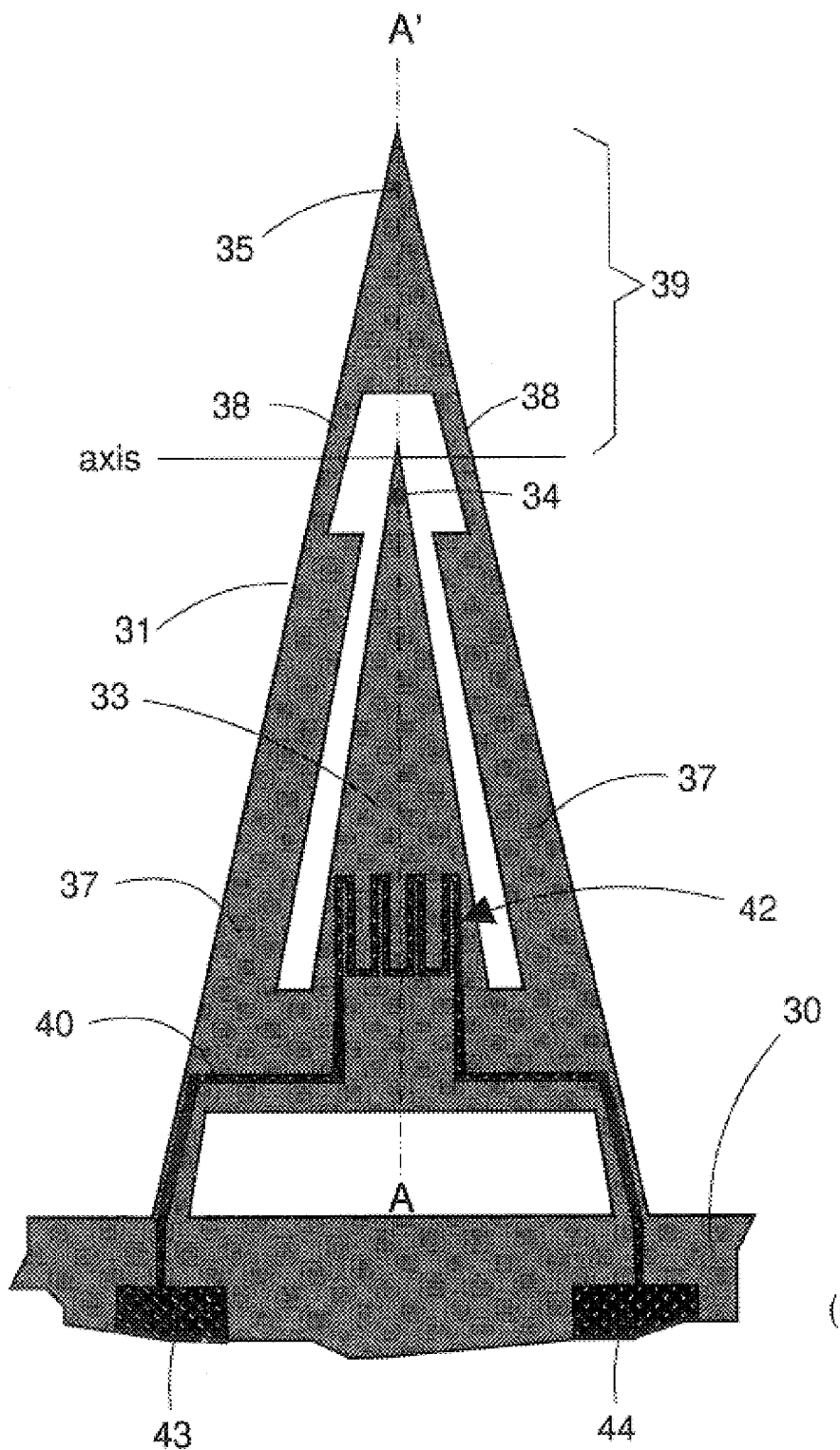
FIG. 3A shows a schematic bottom view of a third embodiment of the present invention.
Figure 3B:
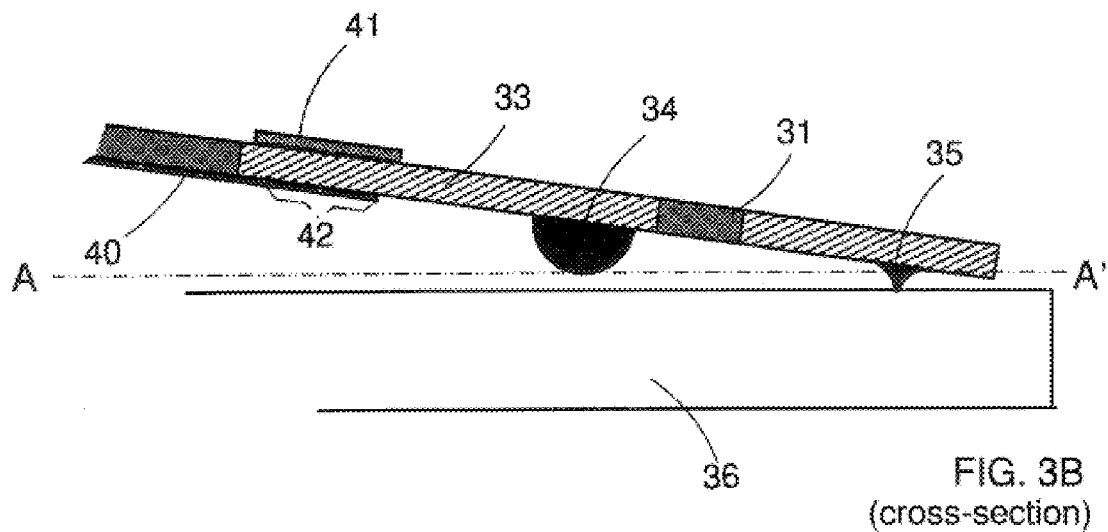
FIG. 3B shows a schematic cross-section of the third embodiment, the smaller probe being in contact mode.
Figure 3C:
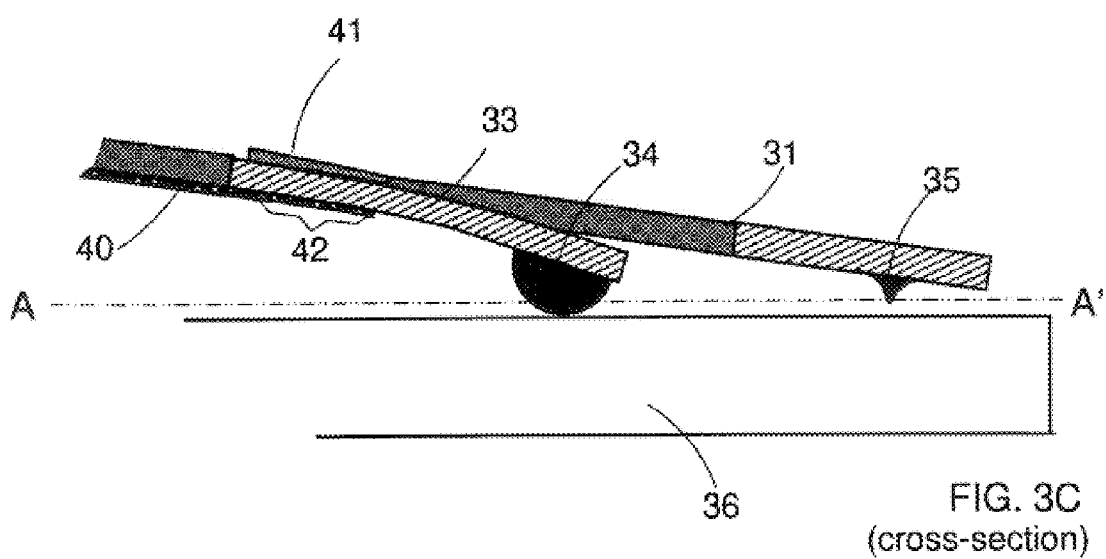
FIG. 3C shows a schematic cross-section of the third embodiment, the smaller probe not being in contact mode.

Another, more detailed embodiment is illustrated in FIGS. 2A and 2B. In this case the cantilevers are triangular shaped. There is a first cantilever 21 with large probe 24 carrying a second cantilever 23 with a smaller probe 25. As described above, the second cantilever 23 may be formed by structuring the first one. Likewise, the second cantilever may be produced separately for later attachment to the first cantilever 21. In FIG. 2A, further details are shown. The second cantilever 23, for example, carries metallization 28 for electrically heating the probe 25. In the present embodiment, there is a resistor (not shown) underneath the probe 25 which heats the probe if a voltage is applied between contact pads 18 and 19. Such an arrangement may be used in a thermomechanical storage system, where information may be stored by forming indents in a storage medium using the heated probe. Furthermore, the smaller cantilever 23 comprises constrictions at its clamped end in order to reduce the stiffness. Piezoresistive sensors 29 are integrated into these constrictions to obtain deflection sensors of high sensitivity. The piezoresistive sensors 29 are connected with the contact pads 17 and 18. In addition to the constrictions, the cantilever may have etch holes 27 at its fixed end. These etch holes, in addition to the constrictions, lead to a further reduction of the cantilever's stiffness. Details of such sensors are given in the above mentioned copending PCT patent publication WO97/09584. The cross-sectional view given in FIG. 2B is essentially the same as the one in FIG. 1B. The only difference is that there is the metallization 28 and a piezoelectric sensor 29 shown. As in case of the first embodiment, the cantilever 23 with small probe 25 can be actuated by means of an actuator or several actuators (not shown). The large cantilever 21 may also comprise an actuator or several actuators, e.g. to bring it into a park position where even the large probe 24 is removed from the sample 26. Not only the smaller cantilever, but also the large cantilever may comprise means for deflection sensing A more sophisticated cantilever arrangement (third embodiment) is illustrated in FIGS. 3A, 3B, and 3C. In this embodiment, the cantilever 33 carrying the large probe 34 is an integral part of the larger cantilever carrying a small probe 35, i.e., in this embodiment the smaller cantilever 33 carries the larger probe 34. The larger cantilever 31 is mechanically connected at the end opposite to its free end to said smaller one such that it mainly follows the movement (deflection) of the smaller cantilever 33. For this reason the legs 37 of the larger cantilever 31 are relatively thick such that it is stiff and follows the smaller cantilever 33. This arrangement has been further elaborated by providing thin portions 38. Due to these thin portions 38 provided in said larger cantilever 31, a kind of a third cantilever portion 39 is obtained. As illustrated in FIG. 3C, this cantilever portion 39 is in a position where the small probe 35 contacts the sample surface 36 if cantilever 33 with large probe 34 is in 'park' position. The thinned portions 38 lead to a reduced stiffness. The movement of the cantilever portion 39 can be better understood assuming a virtual axis (see FIG. 3A). By provision of suitable actuators, various operation schemes for the cantilever arrangement of FIGS. 3A–3C can be achieved. The inner cantilever 33 may be switched up and down by means of an actuator at its clamped end.

In the present case, this actuator comprises a heating element 42 with metallizations 40 and contact pads 43 and 44. On the opposite side of the cantilever 33, there is a metal plate 41 having a larger thermal expansion coefficient than the cantilever. The cantilever 33 is in the 'park' position (see FIG. 3B) if no current flows through the heating element 42. By applying a voltage between contact pads 43 and 44, a current heats the heating element 42 and the fixed end of cantilever 33. The increased temperature in the cantilever leads to an expansion of metal plate 41 which in turn generates a bending force switching the cantilever 33 into contact mode (see FIG. 3C). In this case, the smaller probe 35 does not contact the sample 36 anymore. Using a suitable material having a smaller expansion coefficient than the cantileversit is possible to place a plate on the same side of the cantilever as all other elements 28, 29, etc. A shape-memory alloy (SMA) may also be used for switching the cantilever.

Other modes of operation are possible if the larger cantilever comprises actuators at its thick legs 37 so as to move the whole cantilever 31 together with the cantilever portion 39. Likewise, or in addition, the cantilever portion 39 may be individually actuated employing actuators at the thin portions 38, or close to these thin portions. The stiffness of the cantilever portion 39 may be chosen such that the cantilever portion 39 automatically flips into contact mode if the z-distance falls below a certain minimum distance such that the attractive forces (adhesion) are stronger than the spring force of the cantilever portion 39.

Figure 4:
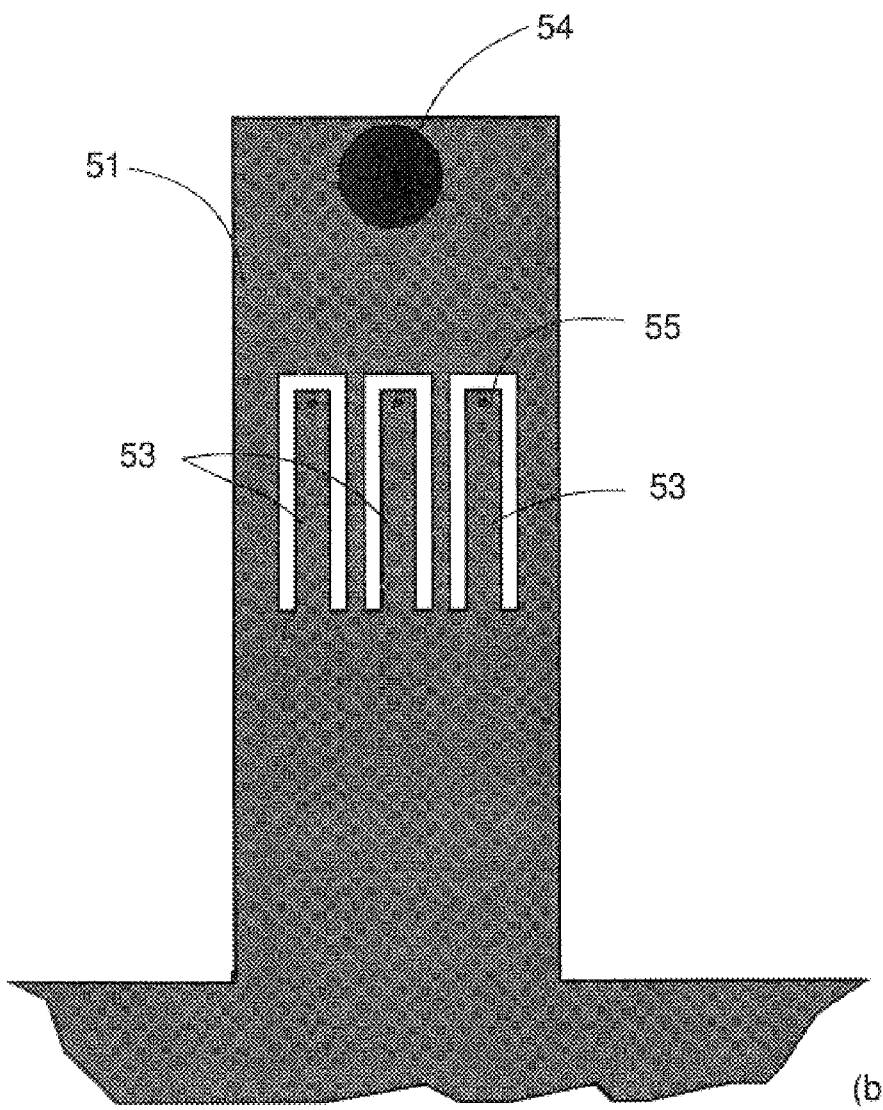
FIG. 4 shows a schematic bottom view of another embodiment of the present invention.
Figure 5:
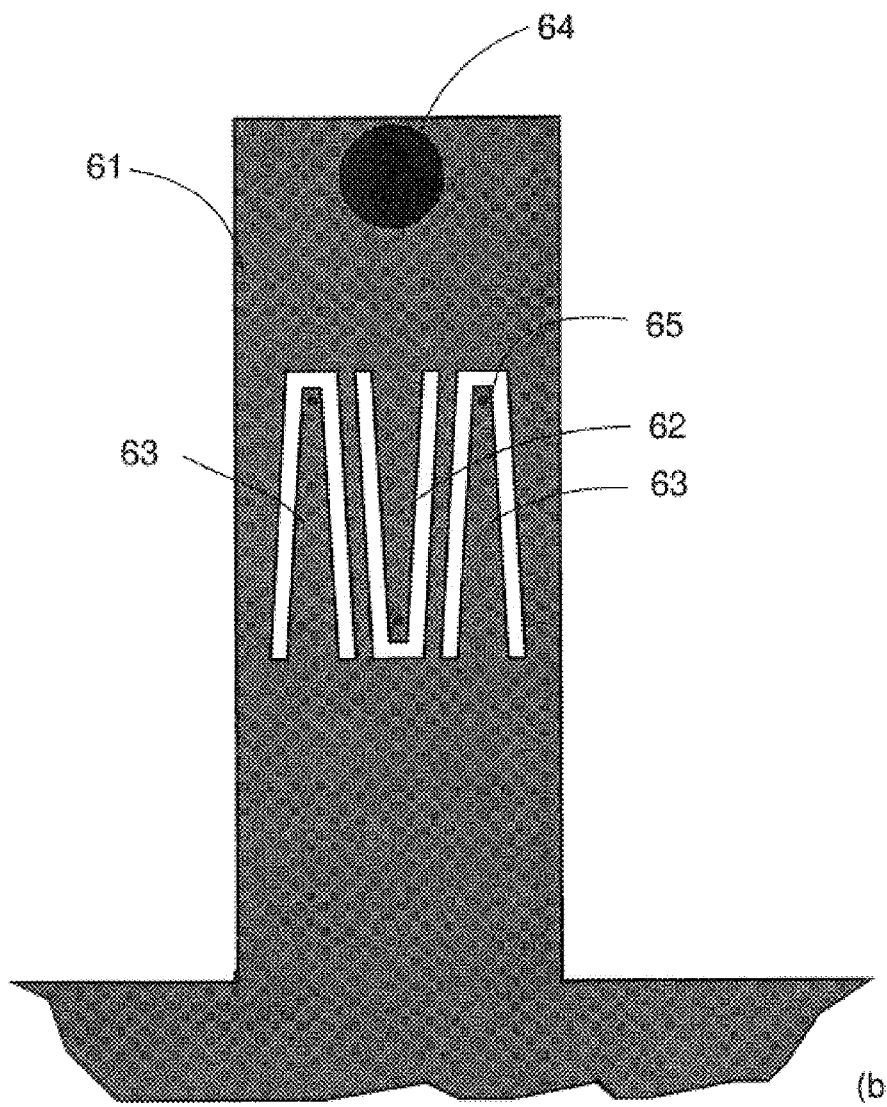
FIG. 5 shows a schematic bottom view of yet another embodiment of the present invention.

Further embodiments of the present invention are given in FIGS. 4 and 5. As can be seen in FIG. 4, there is a large cantilever 51 carrying three smaller cantilevers 53. The large cantilever 51 has a large probe 54 and each of the smaller cantilevers 53 carries a small probe 55. A similar arrangement is illustrated in FIG. 5. In this Figure, the larger cantilever 61, having a large probe 64, and carries three triangular shaped smaller cantilevers 63, each carrying a small probe 65. These smaller cantilevers 63 are arranged in an interlocked manner. These kind of cantilever arrangements, following the basic principle of the present invention are particularly well suited for scanning probe storage applications where an increased data throughput can be obtained by using cantilever arrays for parallel operation. If one employs a cantilever arrangement as shown in FIGS. 4 and 5 in a scanning probe microscope, one scan movement is sufficient to scan three parallel lines.

Figure 6:
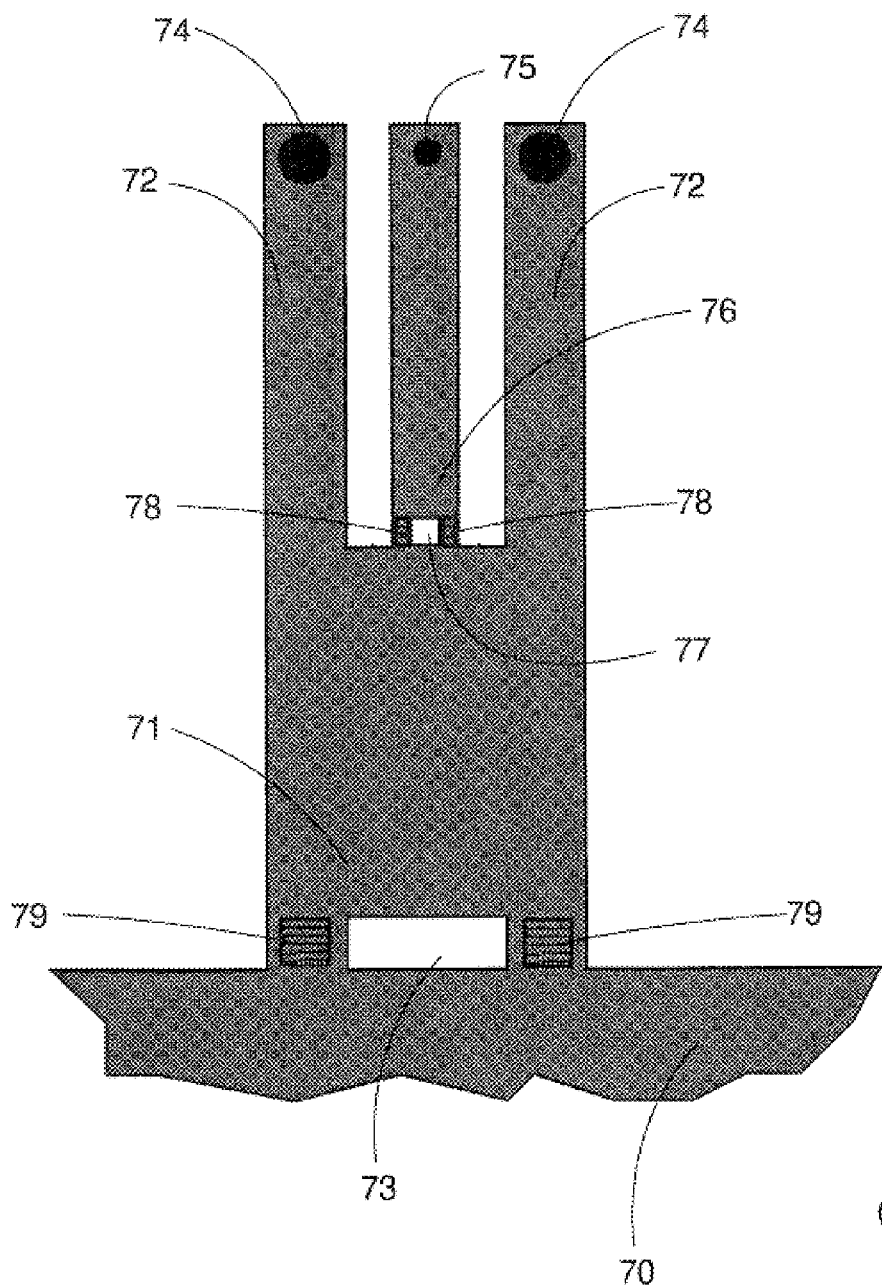
FIG. 6 shows a schematic bottom view of an embodiment according to the present invention where the larger cantilever carries two probes and the smaller cantilever, being an integral part of the large one, carries one probe.

Another embodiment is illustrated in FIG. 6. This embodiment is characterized in that it comprises a larger cantilever 71 being fixed at one end to a substrate 70. At the fixed end of cantilever 71 there is a etch hole 73 employed to modify the stiffness. Close to the etch hole there are deflection sensors 79 situated. At the free and of cantilever 71 a smaller cantilever 76 is formed. As the larger cantilever 71, this smaller cantilever 76 may comprise an etch hole 77 and deflection sensors 78, for example. Cantilever 71 has two probes 74 at its free ends 72 and the cantilever 76 one probe 75. As illustrated, the two probes 74 may be of larger size than the probe 75 carried by cantilever 76. There are various modes of operation conceivable and different arrangements of sensors and actuators (other than the specific arrangement shown) possible.

Figure 7:
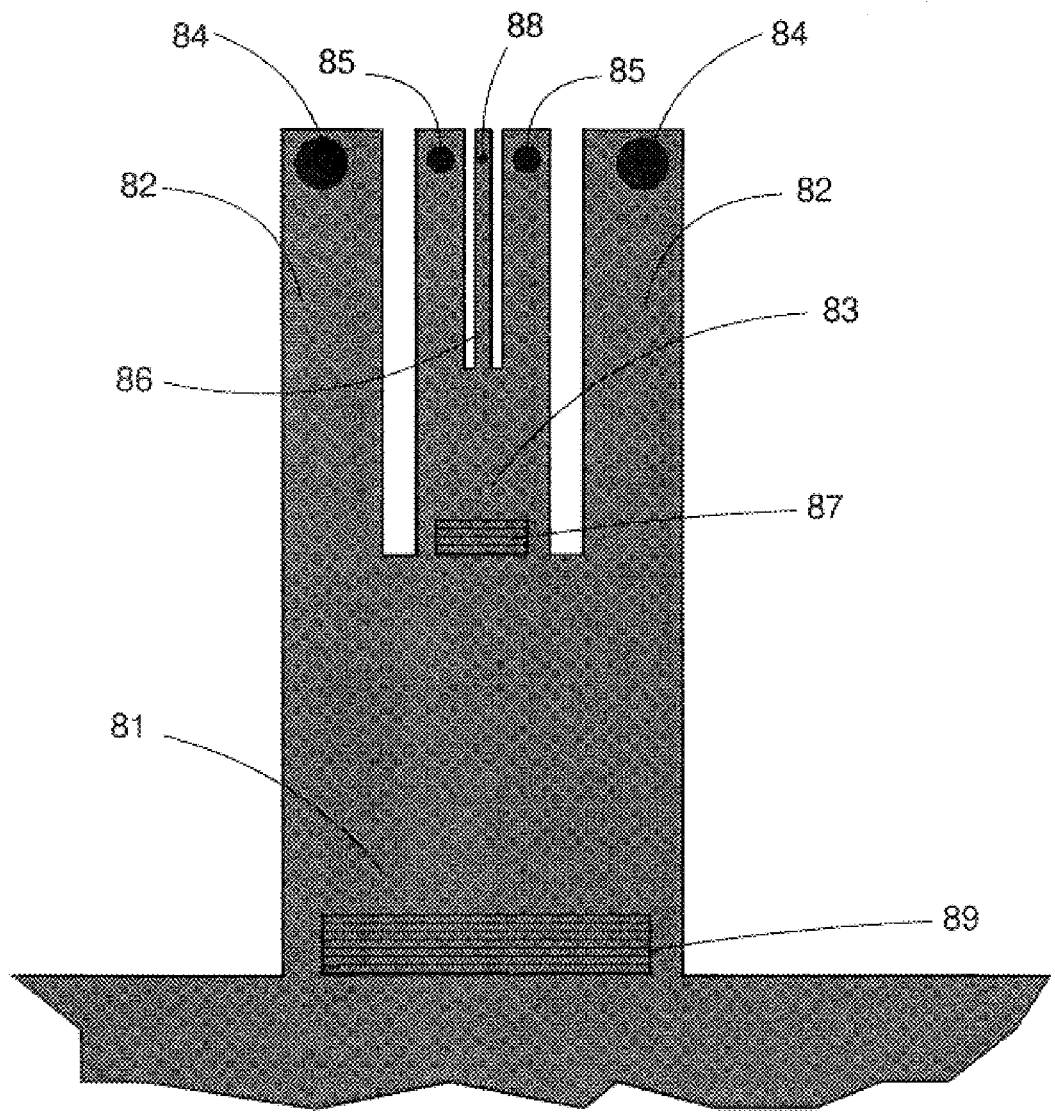
FIG. 7 shows a schematic bottom view of a cascaded cantilever arrangement according to the present invention.

An embodiment with cascaded cantilevers is shown in FIG. 7. There are several smaller cantilevers 83, 82, and 86 being an integral part of a large cantilever 81. The largest cantilever 81 and second largest cantilever 83 are provided with deflection sensors 89 and 87, respectively, in the present example. The smallest cantilever 86 may also comprise means for sensing the deflection. The smaller the cantilevers are, the smaller the respective probes 84, 85, 88, are in the present example, i.e., the cantilever 86 comprises the smallest probe 88. By appropriate processing of the signals from the deflection sensors, various information concerning the scanned surface can be obtained. One of the cantilevers may for example be employed for tracking purposes. This can be achieved by providing a special pattern on the surface to be scanned. Likewise, a groove can be formed on the surface to be investigated such that the tracking cantilever is mechanically guided along this groove. Tracking is of particular importance if one scans a storage medium with a cascaded cantilever, as herein disclosed, or a cantilever array.

One cantilever of the present cantilever arrangement, e.g. the cantilever with the smaller probe, might be operated in a dynamic mode. In this dynamic mode, the respective cantilever is approached to the sample surface and the vibration amplitude is damped. This leads to a decreased resonant frequency which may be used to obtain information concerning the surface scanned. The distance between vibrating second cantilever and surface is mainly defined by the geometry of the cantilever with the larger probe.

The present cantilever arrangement may also be operated such that one of the probes frequently contacts the sample to be scanned. This mode of operation is known as tapping mode.

The present cantilever arrangements can be used to make current scanning probe microscopes more reliable by reducing wear out. As indicated above, the cantilever arrangement facilitates also new modes of operation. The larger probe may be used for longer and/or faster scan excursion and operation with lower resolution. The smaller probe may be used for zooming in if a position of interest has been found, i.e., the smaller probe may be scanned in smaller steps and only with a smaller scan excursion.

In another mode of operation, one of the probes may be operated in STM mode whereas the other probe is operated in AFM mode. Using this approach, one gets additional information by just scanning a sample once. The two signals provided by the AFM probe and the STM probe can be fed through a data acquisition system as claimed in copending patent publication No. WO96/35943 filed May 13, 1995. Due to the additional information obtained by the second probe, images of higher resolution are obtained.

The present invention is well suited for use in scanning probe storage systems. As in case of scanning probe microscopes, the larger probe may be employed to prevent mechanical wear out of the smaller probe. Likewise, or in addition, the smaller probe may be used for reading and writing of bits, whereas the large probe may be used for erasing stored information.

What is claimed is:

1. Cantilever arrangement for scanning a surface, said arrangement comprising a first cantilever having at least a first probe and a second cantilever having a second probe said first cantilever and said second cantilever being mechanically coupled together such that the deflection of said second cantilever depends on the deflection of said first cantilever, said cantilever arrangement further comprising actuator means for bringing the second probe from a non-operational mode into an operational mode while the first probe is in an operational mode.

2. The cantilever arrangement of claim 1, wherein either said second cantilever is an integral part of said first cantilever, or wherein said first cantilever is an integral part of said second cantilever.

3. The cantilever arrangement of claim 1, wherein said first and second probes differ in size, shape, robustness, or material.

4. The cantilever arrangement of claim 1, wherein said first cantilever is operated in contact mode while said second cantilever is not used, or while said second cantilever is operated in contact mode, tapping or oscillation mode where said second cantilever frequently contacts said surface, non-contact mode, or dynamic mode.

5. The cantilever arrangement of claim 4, wherein said second cantilever comprises actuator means for switching said second cantilever into the respective mode, or for operating said second cantilever in the respective mode.

6. The cantilever arrangement of claim 1, wherein said second cantilever is designed such that attractive forces, or externally controllable forces pull said second cantilever into contact mode.

7. The cantilever arrangement of claim 1, wherein said second cantilever comprises oscillator means for oscillating said second cantilever such that said second cantilever either frequently contacts said surface, or oscillates without contacting said surface.

8. The cantilever arrangement of claim 1, wherein said first cantilever and/or said second cantilever comprises a sensor for movement detection.

9. The cantilever arrangement of claim 8, wherein said sensor for movement detection is a piezoresistive sensor, situated in a constriction at the fixed end of the respective cantilever whose movement is to be detected.

10. The cantilever arrangement of claim 1, comprising means for heating one of said probes for interaction with said surface.

11. Cantilever arrangement for scanning a surface, said arrangement comprising a first cantilever having at least a first probe and a second cantilever having a second probe said first and second cantilevers being mechanically coupled such that the deflection of said second cantilever depends on the deflection of said first cantilever, wherein said first cantilever comprises actuator means for switching said first cantilever into contact mode, said second cantilever being mechanically coupled with said first cantilever such that said second cantilever is in non-contact mode if said first cantilever is in contact mode and vice versa.

12. The cantilever arrangement of claim 11, wherein one of the two cantilevers comprises a third cantilever portion thereof which can be deflected relative to a remaining portion of said one cantilever.

13. The cantilever arrangement of claim 11, wherein said actuator means comprises a heating element for locally increasing the temperature in said first cantilever and means for generating a bending force if the temperature increases.

14. Cantilever arrangement for scanning a surface, said arrangement comprising a first cantilever having at least a first probe and a second cantilever having a second probe said first and second cantilevers being mechanically coupled such that the deflection of said second cantilever depends on the deflection of said first cantilever, wherein said first cantilever comprises multiple smaller cantilevers.

15. The cantilever arrangement of claim 14, wherein said first cantilever comprises cascaded smaller cantilevers.

16. Scanning probe system comprising a cantilever arrangement according to any of the preceding claims.

17. The scanning probe system of claim 16, being used for inspection of semiconductor chips, for investigation of sample surfaces, or for structuring surfaces.

18. The scanning probe system of claim 17, comprising means for scanning said semiconductor chips, sample surfaces, or surfaces to be structured with said first probe at lower resolution than said second probe.

19. The scanning probe system of claim 17, comprising means for scanning said semiconductor chips, sample surfaces, or surfaces to be structured with said second probe at lower resolution than said first probe.

20. The scanning probe system of claim 17, comprising means for switching between low resolution and high resolution.

21. The scanning probe system of claim 16, being part of a storage system.

22. The scanning probe system of claim 21, wherein said cantilever arrangement is used for reading and erasing information from a storage medium, and for writing information onto said storage medium.

* * * * *